(12) United States Patent
Tritschler et al.

(10) Patent No.: US 12,109,849 B2
(45) Date of Patent: Oct. 8, 2024

(54) ROTARY TRANSMISSION DEVICE FOR TRANSMITTING CONTROL AND/OR WORKING PRESSURES TO A WHEEL HUB OR A VEHICLE WHEEL RECEIVED BY THE WHEEL HUB

(71) Applicants: ILLINOIS TOOL WORKS INC., Glenview, IL (US); KT PROJEKTENTWICKLUNGS GMBH, Untergruppenbach (DE)

(72) Inventors: Eva Tritschler, Bodman-Ludwigshafen (DE); Christiane Schwarz, Pfullendorg (DE); Roland Braun, Herdwangen-Schonach (DE); Henry Klemm, Überlingen (DE); Martin Spindler, Herdwangen-Schonach (DE); Bruno Schulze Selting, Rielasingen-Worblingen (DE)

(73) Assignee: Illinois Tool Works Inc., Glenview, IL (US)

( * ) Notice: Subject to any disclaimer, the term of this patent is extended or adjusted under 35 U.S.C. 154(b) by 656 days.

(21) Appl. No.: 16/965,219

(22) PCT Filed: Jan. 28, 2019

(86) PCT No.: PCT/US2019/015376
§ 371 (c)(1),
(2) Date: Jul. 27, 2020

(87) PCT Pub. No.: WO2019/148079
PCT Pub. Date: Aug. 1, 2019

(65) Prior Publication Data
US 2022/0227186 A1    Jul. 21, 2022

(30) Foreign Application Priority Data
Jan. 26, 2018   (DE) ..................... 10 2018 000 636.1
Nov. 29, 2018   (DE) ..................... 10 2018 130 307.6

(51) Int. Cl.
*B60C 23/00*    (2006.01)

(52) U.S. Cl.
CPC .. *B60C 23/00372* (2020.05); *B60C 23/00318* (2020.05); *B60C 23/00345* (2020.05); *B60C 23/00354* (2020.05); *B60C 23/00363* (2020.05)

(58) Field of Classification Search
CPC ........ B60C 23/00372; B60C 23/00318; B60C 23/00345; B60C 23/00354; B60C 23/00363

See application file for complete search history.

(56) References Cited

U.S. PATENT DOCUMENTS

| | | |
|---|---|---|
| 4,705,090 A | 11/1987 | Bartos |
| 4,892,128 A | 1/1990 | Bartos |
| 2014/0183826 A1 | 7/2014 | Tajan |

FOREIGN PATENT DOCUMENTS

| | | |
|---|---|---|
| CN | 101360622 A | 2/2009 |
| CN | 105408135 A | 3/2016 |

(Continued)

OTHER PUBLICATIONS

European Patent Office (EPO), Rijswijk, NL, Int'l Search Report, Form PCT/ISA/210 for Int'l Application No. PCT/EP2018/015376, dated Apr. 16, 2019 (2 pages).

(Continued)

*Primary Examiner* — Scott A Browne
(74) *Attorney, Agent, or Firm* — McAndrews, Held & Malloy, Ltd.

(57) ABSTRACT

A rotary transmission device for transmitting control and/or working pressures to a wheel hub. The rotary transmission device has a housing structure in which a piston element is displaceable between a first and a second position relative to the housing structure and relative to a running body of the wheel hub which is mounted so as to rotate relative to the housing structure. To transmit the control and/or working (Continued)

pressures, at least one pressure medium channel is formed in the piston element. In the first position, an air gap is present between an end face of the piston element on the running body side and an end face of the running body on the piston element side, while in the second position, no air gap is present, and the at least one pressure medium channel opens in sealed fashion into at least one pressure medium channel formed in the running body.

21 Claims, 11 Drawing Sheets

(56) References Cited

FOREIGN PATENT DOCUMENTS

| | | |
|---|---|---|
| CN | 106457934 A | 2/2017 |
| CN | 106715162 A | 5/2017 |
| DE | 2 425 497 | 12/1974 |
| DE | 4036362 A1 | 5/1992 |
| DE | 10 2013 203 680 A1 | 9/2014 |
| DE | 10 2014 117 458 A1 | 9/2015 |
| EP | 1 095 799 A1 | 5/2001 |
| EP | 2 602 517 A1 | 6/2013 |

OTHER PUBLICATIONS

German Patent Office, Office Action for German Patent Application No. 10 2018 130 307.6, dated May 21, 2021, Munich, Germany (5 pages).

ROTARY TRANSMISSION DEVICE FOR TRANSMITTING CONTROL AND/OR WORKING PRESSURES TO A WHEEL HUB OR A VEHICLE WHEEL RECEIVED BY THE WHEEL HUB

BACKGROUND OF THE INVENTION

Field of the Invention

The present invention generally concerns a system for transmitting control and/or working pressures, in particular, in a wheel unit with a rotatably mounted wheel tire. According to embodiments of the invention, this concerns in particular a rotary transmission device for transmitting control and/or working pressures to a wheel hub or to a wheel rim received by the wheel hub.

The invention further concerns a wheel unit with such a rotary transmission device for transmitting control and/or working pressures, and a distributed system for pressure medium supply which comprises a plurality of wheel units, each with a corresponding rotary transmission device for transmitting control and/or working pressures.

Discussion of Related Art

Vehicle tires are usually filled with compressed air. Filling with other pressurised media, for example nitrogen, is also conceivable. Vehicle tires in the sense of the present disclosure may for example be tubed tires or tubeless tires. Vehicle tires are used, for example, on cars, buses, trucks, and also on aircraft.

Conventional vehicle tires are usually supplied with a pressure medium such as compressed air or a nitrogen filling via external ports. Normally standardised valves are used for this. Vehicle tires usually have an optimal operating pressure or filling pressure dependent on the respective usage or operating conditions. For example, for land-based vehicles, e.g., cars, buses or trucks, operating pressures or pressure ranges apply which, as far as possible, guarantee an optimum of rolling resistance, lateral guidance, longitudinal guidance, heat development and/or wear behavior.

An existing actual pressure in a tire may fluctuate within certain limits, for example, with ambient temperature or operating temperature. Furthermore, in the long term, a certain pressure loss known as insidious pressure loss often cannot be fully avoided. Systems for vehicles are known which allow monitoring of the operating pressure or fill pressure in the tire. These may be active or passive systems.

Passive systems may, for example, be designed for determining the rolling circumference of the tires of an axle and comparing these with each other. If significant differences arise, this suggests that pressure differences exist in the respective tires. Active systems for measuring and/or monitoring compressed air usually comprise pressure monitoring sensors which are integrated in a wheel unit. Such pressure sensors may for example also be designed to transmit corresponding pressure signals wirelessly or by wire from the (rotating) tire to fixed components of the vehicle.

Furthermore, in principle, systems are known which allow autonomous adaptation of the filling pressure of vehicle tires. Such systems are for example used on all-terrain vehicles, military vehicles or similar special vehicles. The systems may in principle be configured to allow an adjustment of the filling pressure when the vehicle is stationary, i.e. when the vehicle is not moving.

Known systems for autonomous pressure regulation in vehicles have a central structure. In other words, this means that there is only one device for providing the pressure medium for filling the tires. It is also conceivable that a few devices for supplying pressure medium are provided, for example, for a combination of a tractor unit and a trailer or semitrailer. Nevertheless, such a central supply device for compressed air is intended to fill a plurality of wheel units, in particular on different axles. To this end, the central compressed air or pressure medium supply unit must be coupled to a plurality of wheel units. Normally therefore, the supply unit is arranged on the chassis or bodywork or on the superstructure of the vehicle. The supply unit may, for example, comprise a compressor or air compressor. Starting from the supply unit, it is now necessary to lay a plurality or multiplicity of compressed air lines or pressure medium lines to the individual wheel units. For this, usually a plurality of so-called rotary passages for the pressure medium lines must be provided. This is because the tires of the wheel units are normally mounted rotatably on the vehicle axles.

In principle, the transmission of corresponding control and/or working pressures from a unit mounted centrally relative to the vehicle, to a wheel hub or a wheel rim received on the wheel hub, is relatively difficult and complicated since the wheel unit with the wheel hub and vehicle wheel is mounted so as to rotate about the wheel axis. The known rotary transmission devices have an increased tendency to wear, so that until now there has been no widespread use of central pressure medium supply devices in vehicles, in particular because of the substantial additional costs and running costs.

SUMMARY OF THE INVENTION

In this context, the invention is based on the object of refining a rotary transmission device of the type cited initially such that this is distinguished by high robustness and, when not in use, has little effect on the vehicle. In addition, the rotary transmission device is distinguished by low tendency to wear and pronounced durability.

The object on which the invention is based is achieved according to the invention by the subject of independent claim 1, wherein advantageous refinements of the rotary transmission device are given in the dependent claims.

Accordingly, the invention includes a rotary transmission device for transmitting control and/or working pressures to a wheel hub or a vehicle wheel received by the wheel hub, wherein the rotary transmission device has a housing structure in which a piston element is displaceable between a first position and a second position relative to the housing structure and relative to a running body of the wheel hub which is mounted so as to rotate about a wheel axis relative to the housing structure. In order to transmit the control and/or working pressures, at least one pressure medium channel is formed in the piston element.

According to embodiments of the invention, it is provided in particular that in the first position of the piston element, an air gap is present between an end face of the piston element on the running body side and an end face of the running body on the piston element side, while in the second position of the piston element, no air gap is present between the end face of the piston element on the running body side and an end face of the running body on the piston element side, and the at least one pressure medium channel of the piston element opens in sealed fashion (against atmosphere) into at least one pressure medium channel formed in the running body.

The subject of the invention is distinguished in particular in that when the rotary transmission device is not in use, the piston element is not in contact with the running body of the wheel hub and hence not subject to wear.

Embodiments of the rotary transmission device according to the invention are distinguished in particular in that the piston element is formed as a pneumatically actuatable piston element, which can be transferred into its second position on application of a corresponding control pressure, in particular on its end face opposite the end face on the running body side. In this context, it is suitable if the piston element is movable relative to the housing structure and relative to the running body under application of a corresponding control pressure, wherein the control pressure in particular is different from the control and/or working pressure to be transmitted. This control and/or working pressure is a control and/or working pressure for components in the wheel hub or vehicle wheel.

According to embodiments, a control pressure port is provided for supply and discharge, as required, of a control pressure to and from a control chamber assigned to the piston element. The control chamber is formed at least in regions by a side face of the piston element, which in particular lies opposite the end face of the piston element on the running body side.

With rotary transmission systems according to embodiments of the invention, to ensure that not only can pressures be transmitted to the wheel hub or to the vehicle wheel received by the wheel hub, but also pressures can be transmitted from the wheel hub or the vehicle wheel received by the wheel hub, it is provided that the control chamber is hermetically separated from the at least one pressure medium channel formed in the piston element.

According to embodiments of the rotary transmission device according to the invention, at its end region on the running body side, the piston element has a sealing element which at least in regions forms the end face of the piston element on the running body side, and in which at least one pressure medium channel is formed, which is preferably configured axially to the pressure medium channel formed in the piston element and opens into the pressure medium channel formed in the piston element. In such embodiments, it is therefore provided that when the rotary transmission device is not in use, the sealing element provided for sealing the pressure medium transmission against the external atmosphere is not subject to wear.

In this context, it is advantageous if the at least one pressure medium channel formed in the sealing element has, at least on the end face of the piston element on the running body side, a diameter which is greater than the diameter of the at least one pressure medium channel formed in the piston element. With this embodiment, when the rotary transmission device is in use, i.e., when the piston element is in its second position, it is ensured that a secure pressure medium transmission can be achieved to the at least one pressure medium channel formed in the running body, even if the running body is not oriented optimally relative to the housing structure of the rotary transmission device.

The present invention is not restricted to embodiments in which the piston element has merely a single pressure medium channel. Rather, the invention evidently also concerns embodiments in which at least two or more pressure medium channels are formed in the piston element, and open into corresponding pressure medium channels in the sealing element provided on or forming the end region of the piston element on the running body side.

In particular, the invention also concerns embodiments in which at least one pressure medium channel is formed in the running body, opens into the end face of the running body on the piston side, and with regard to the at least one pressure medium channel formed in the piston element and/or in regard to the at least one pressure medium channel formed in the sealing element, is configured such that in a state in which the piston element is in its second position, a flow path or flow route, preferably sealed against the external atmosphere, is formed from the at least one pressure medium channel formed in the piston element to the at least one pressure medium channel formed in the running body.

According to preferred embodiments of the rotary transmission device according to the invention, the housing structure has at least one pressure medium port via which control and/or working pressures can be supplied to the at least one pressure medium channel formed in the piston element. Here, at least in a state in which the piston element is in its second position, a pressure medium distribution channel is present between an end face of the piston element opposite an end face of the piston element on the running body side and an inner wall of the housing structure, into which channel the at least one pressure medium port opens.

Preferably, a sealing arrangement is assigned to the piston element for sealing the piston element against the pressure medium distribution channel. Similarly, it is advantageous if a sealing arrangement is assigned to the piston element for sealing the piston element against the housing structure.

According to embodiments of the rotary transmission device according to the invention, a preload element, preferably in the form of a spring element or similar, is assigned to the piston element for preloading the piston element in its first position, wherein advantageously the preload force can be adjusted accordingly.

According to embodiments of the invention, the housing structure, the piston element, the sealing element provided at the end region on the running body side, and the running body, are each formed as a ring and arranged coaxially to the wheel axis. In other words, the rotary transmission device is substantially designed as a ring body. This allows the use on a driven axle without the need to drill shafts and hubs. At the same time, due to both modifications, the small installation space between the wheel bearing and wheel hub is used as an installation site.

In this context, the at least one pressure medium channel formed in the piston element can also be configured as a ring channel, wherein the same applies accordingly to the at least one pressure medium channel in the sealing element on the end region of the piston element on the running body side or in the running body.

Advantageously, the piston element can be formed as a pneumatically actuatable piston element which can be transferred into its second position by application of a corresponding control pressure, in particular on its end face opposite the end face on the running body side. Here, the control pressure may correspond either to the control and/or working pressure to be transmitted to the wheel hub or running body of the wheel hub, or the control pressure is supplied accordingly via a separate control pressure port in the housing structure.

Alternatively, evidently it is also conceivable that the piston element can be formed as an electromagnetically actuatable piston element.

According to embodiments, the system according to the invention furthermore comprises a pressure-selective control module which comprises at least three control units, sealing plugs, a check valve, connection to the tire, push-rod seal, piston spring, piston seal, vent bore and a connection to the rotary transmission device.

At least one of the at least three control units differs in the rest position from the others of the at least three control units. This position is characterized by the position of the check valve. In particular, in the system according to the invention, it is provided that in the rest position, in this at least one of the least three control units, the spring of the check valve is preloaded so that the valve is closed in this control unit. In this context, in this example according to the invention, the control unit can be moved by a defined control pressure ($p_{SB}$) of the at least one of the at least three control units. The result of this position of the at least one of the at least three control units is that the other control units of the least three control units have an opened position of the valves.

The at least three control units of the pressure-selective control module can be characterized in that the corresponding piston surface areas are identical. This guarantees that the at least three springs of the at least three check valves are preloaded such that when the control pressure rises continuously, the at least three control units successively switch from the tire pressure input to the purge bore connection.

The terms "rotary transmission" or "rotary passage" generally refer to a connection which allows control and/or working pressures to be transmitted independently of a rotational position of the wheel/rim insert relative to the outlet.

The present invention furthermore includes a pressure medium supply system for a multi-track vehicle with at least two vehicle wheels, each of which is provided with a rotary transmission device of the type described above for transmission of control and/or working pressures.

It is understood that the features listed above and to be explained below may be used not only in the combination given but also in other combinations or alone without leaving the scope of the present invention.

BRIEF DESCRIPTION OF SEVERAL VIEWS OF THE DRAWINGS

Further features and advantages of the invention will be understood by the following description of an exemplary embodiment with reference to the enclosed drawings, wherein.

DETAILED DESCRIPTION OF THE INVENTION

Figure 1:
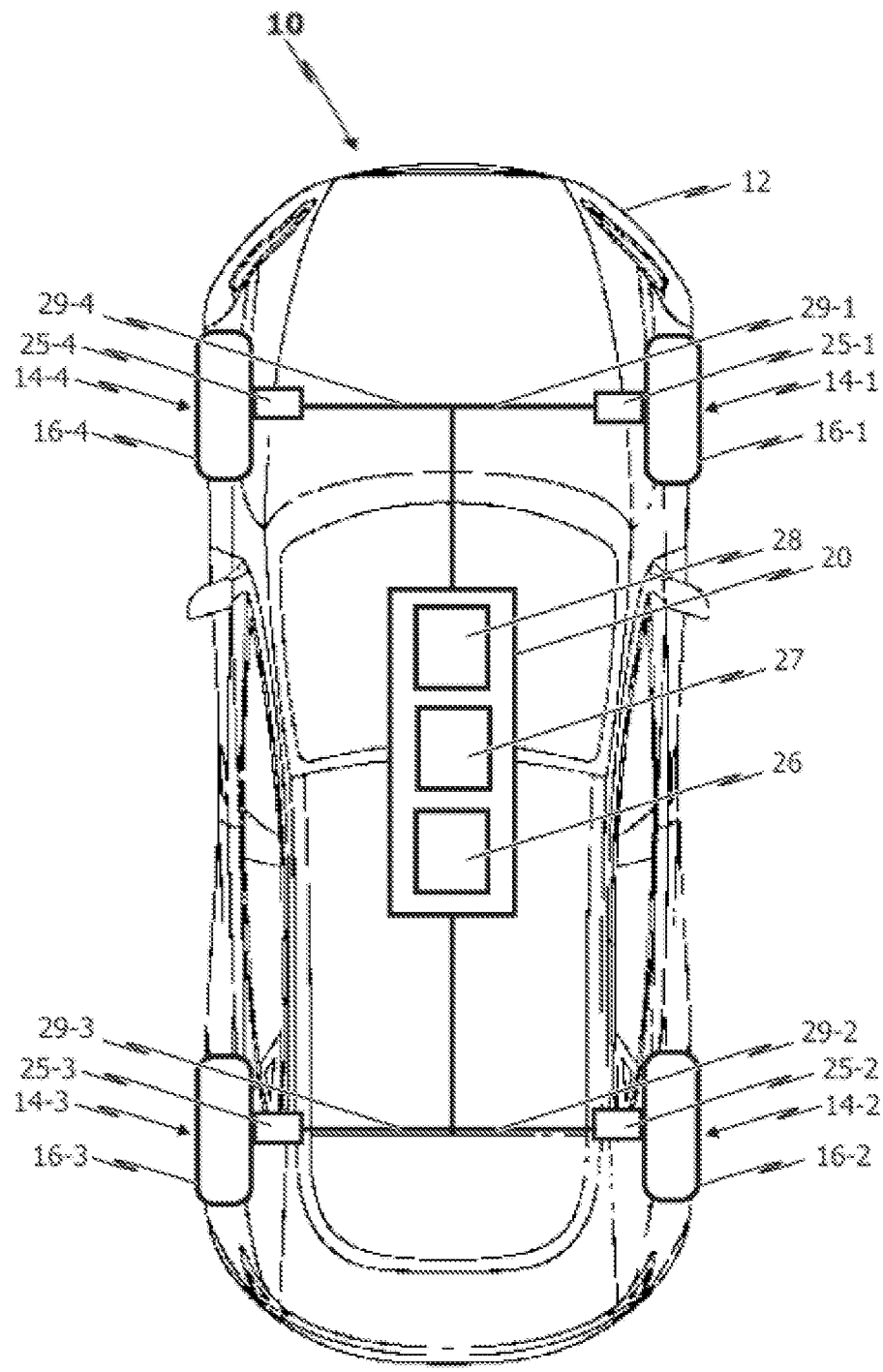
FIG. 1 shows, diagrammatically and in greatly simplified form, a top view of a vehicle equipped with a central pressure medium supply system.

FIG. 1 shows a diagrammatic, greatly simplified top view of the vehicle 10, which is shown as an example as a car. It is understood that the vehicle 10 may alternatively be designed as a utility vehicle, or in general as a land-based vehicle. The present disclosure is not restricted to land-based vehicles. For example, use on aircraft that have running gear is also conceivable.

A chassis or body of the vehicle 10 is designated 12.

The vehicle 10 has a plurality of axles 14-1, 14-2 which are offset from each other in the longitudinal direction of the vehicle. The vehicle 10 shown in FIG. 1 is a two-axle vehicle. It is understood that multi-axle vehicles (trucks which may be configured with three axles or four axles), but also single-axle vehicles (such as semitrailers, trailers or similar) are also included in the scope of the disclosure.

It is understood that the vehicle 10 may generally be designed as a powered vehicle. However, the vehicle 10 may also be a propelled or towed vehicle, in particular a trailer, semitrailer or similar. The vehicle 10 illustrated in FIG. 1 is a multi-track vehicle, in particular a two-track vehicle. The present disclosure may also however relate to single-track vehicles (motorcycles, scooters or similar).

The vehicle 10 has four vehicle wheels 16, two of which are assigned to each of the axles 14-1, 14-2. Clockwise, the vehicle wheels are designated 16-1, 16-2, 16-3, 16-4.

The vehicle 10 has an integrated (on-board) pressure medium supply system 20. The pressure medium supply system 20 is illustrated merely diagrammatically in FIG. 1 by means of a block diagram. The pressure medium supply system 20 comprises a pressure medium supply device in the form of a pump 21, and a pressure medium intermediate store 22 (see pneumatic diagram in FIG. 2).

The vehicle wheels 16 usually carry tires which can be filled with a pressure medium. Normally, tires are filled with air. It is however also conceivable to fill the tires with nitrogen or similar. For monitoring, regulation and adjustment of the pressure level in the tires of the vehicle wheels 16, in the centrally designed pressure generator of the pressure medium supply system 20, each vehicle wheel 16 is provided with a rotary transmission device 25 (see FIG. 2) by means of which pressure medium can be supplied from the central pressure generator of the pressure medium supply system 20 to the vehicle wheels 16.

Hence the pressure medium supply system 20 may be coupled directly or indirectly, electrically or hydraulically, to the rotary transmission devices 25. This may also serve for transmission of electrical energy or for information exchange and control purposes.

As an example, the pressure medium supply system 20 includes a control device 26 which comprises or is coupled to a signal processing unit and an energy storage unit 28. The control device 26 may, for example, be coupled to a main energy storage unit (main battery) of the vehicle 10. Alternatively, it is conceivable to provide separate energy storage units 28 for the control device 26 or couple these to the control unit 26.

The signal processing unit 27 may be designed as part of a general vehicle control system. Alternatively, the signal processing unit 27 may be configured as a separate module. The control device 26 is configured to monitor a state of the vehicle wheels 16, in particular the tires, in order to establish a need for pressure medium. This may take place via a direct or indirect tire pressure monitoring at the wheel 16. Accordingly, the control device 26 may be configured to actuate one or more rotary transmission device(s) 25, preferably pneumatically or alternatively electrically, in order to achieve a desired pressure in the tires of the wheels 16.

Alternatively or additionally, the rotary transmission devices 25 may also be configured to maintain autonomously a specific target state or target range concerning the pressure in the tires of the vehicle wheel 16. In this operating state, no external control commands would be required. Combined forms are conceivable in which, first, central control signals for pressure regulation are produced, and second, an at least partially decentralised autonomous regulation is possible, e.g., during emergency operation.

According to the example illustrated in FIG. 1, the pressure medium supply system 20 is or can be coupled via pneumatic lines 29 to the rotary transmission devices 25. The lines 29 are in particular configured to transmit control and/or working pressures to the rotary transmission devices 25. In addition, the lines 29 may also be designed and configured as electrical lines for transmitting information, signals, measurements, parameters or similar. It is also understood that several lines may be provided for the purposes of energy transmission and information transmission.

According to the depiction in FIG. 1, the pressure medium supply system 20 is or can be connected to a first rotary transmission device 25-1 via a first line 29-1, to a second rotary transmission device 25-2 via a second line 29-2, to a third rotary transmission device 25-3 via a third line 29-3, and to a fourth rotary transmission device 25-4 via a fourth line 29-4.

The pressure medium supply system 20 is configured to make adaptations to the pressure or air pressure in the tires of the wheel 16 during operation of the vehicle 10. It is not therefore necessary to slow or stop the vehicle 10 in order to make adaptations to the pressures in the tires. Instead, the rotary transmission devices 25 are configured to be able to make changes to the pressure even during a relative rotation between the vehicle wheels 16 and the axles 14 of the vehicle.

Preferably, the control device 26 of the pressure medium supply system 20 is configured to detect pressure losses, wherein the detection includes identification of tire damage. To this end, for example, a defined pressure over a specific time may be used as a threshold value for a failure or tire damage.

In addition, the pressure medium supply system 20 is configured to monitor a pressure in the tires of the wheels 16 over a long period. In this way, any seasonal (temperature-induced) pressure fluctuations or natural long-term pressure fall in the wheel 16 can be detected and compensated. Further use for the pressure medium supply system 20 may result from targeted adaptation of the pressure in the wheels 16. For example, in this way it is possible to react to different load states, axle loads, road surface states, weather conditions or similar.

Figure 2:
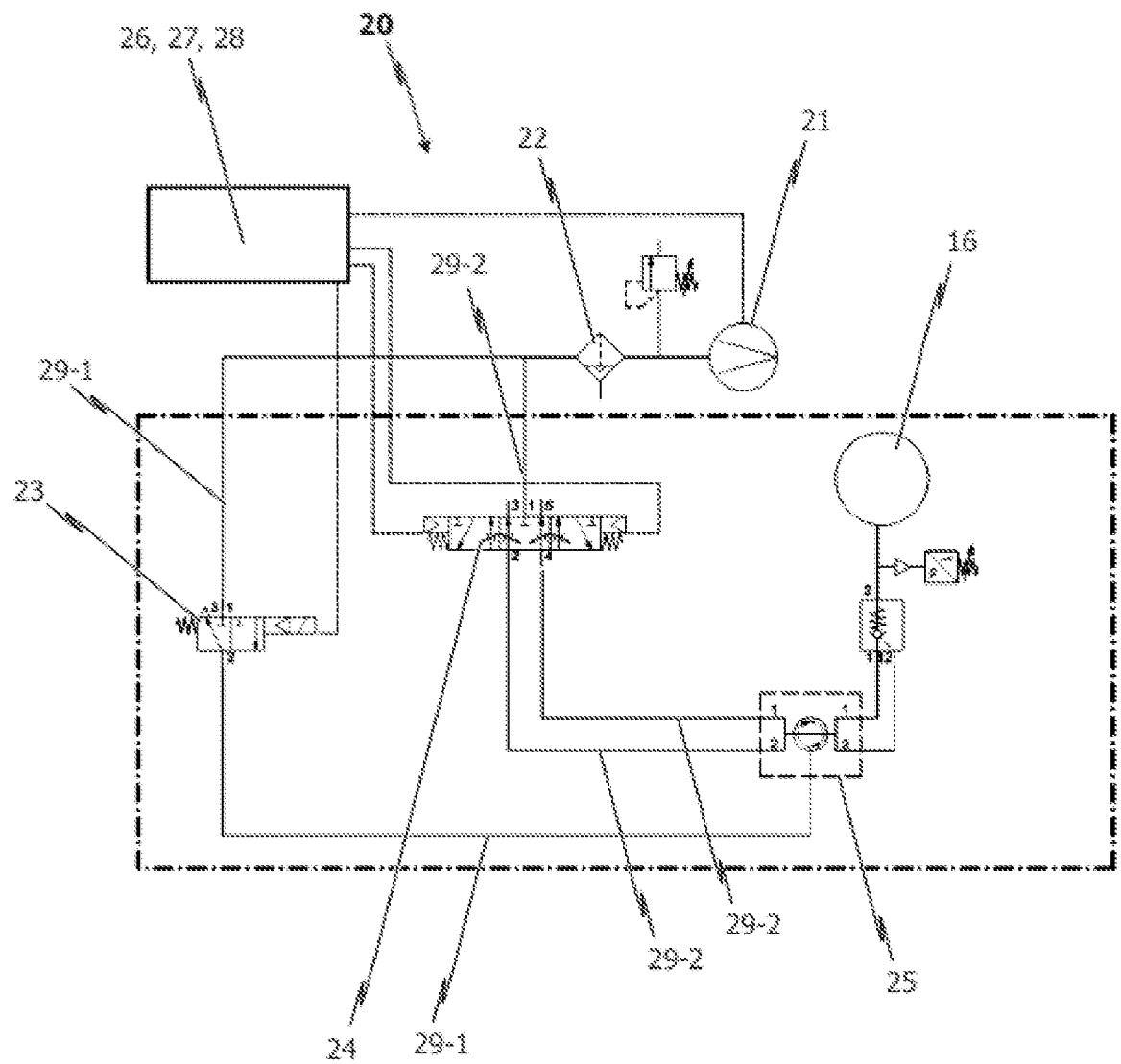
FIG. 2 show, diagrammatically and in greatly simplified form, a pneumatic diagram of part of the central pressure medium supply system from FIG. 1.

FIG. 2 shows diagrammatically a circuit diagram of the pressure-controlled rotary transmission concept according to FIG. 1.

The central control unit (control device 26) indicated diagrammatically in this exemplary embodiment comprises corresponding sensor receivers with power inputs. The control unit 26 is connected to a (central) pressure medium supply device 21 in the form of a pump in order to actuate this as required. The pressure-side output of the pressure medium supply device 21 may be connected fluidically to a pressure accumulator 22 in order to store or temporarily store control and/or working pressures.

The pressure accumulator 22 or the pressure-side output from the pressure medium supply device 21 is connected via a corresponding pressure medium line system 29-1 to a valve block 23 for control pressures for the rotary transmission system. Via a further pressure medium line system 29-2, the pressure accumulator 22 or the pressure-side output from the pressure medium supply device 21 is connected to a further valve block 24 so as to guarantee filling and venting of the tire of a correspondingly assigned wheel unit 6. Corresponding filling and evacuation lines lead from the valve blocks 23, 24 to the rotary transmission device 25 which is indicated merely diagrammatically in FIG. 2. This rotary transmission device 25 provides a pressure-controlled rotary transmission between the wheel bearing and the hub of the corresponding wheel unit 6.

It is noted here that the components contained in the block drawn in dotted lines constitute the components necessary for each wheel unit 6.

An exemplary design of a rotary transmission device 25 for transmitting control and/or working pressures to a vehicle wheel received by a wheel hub 1 is explained in more detail below with reference to the depiction in FIGS. 3 to 6. This exemplary embodiment of the rotary transmission device 25 may be used for example in the pressure medium supply system 20 shown in FIG. 1.

Figure 3:
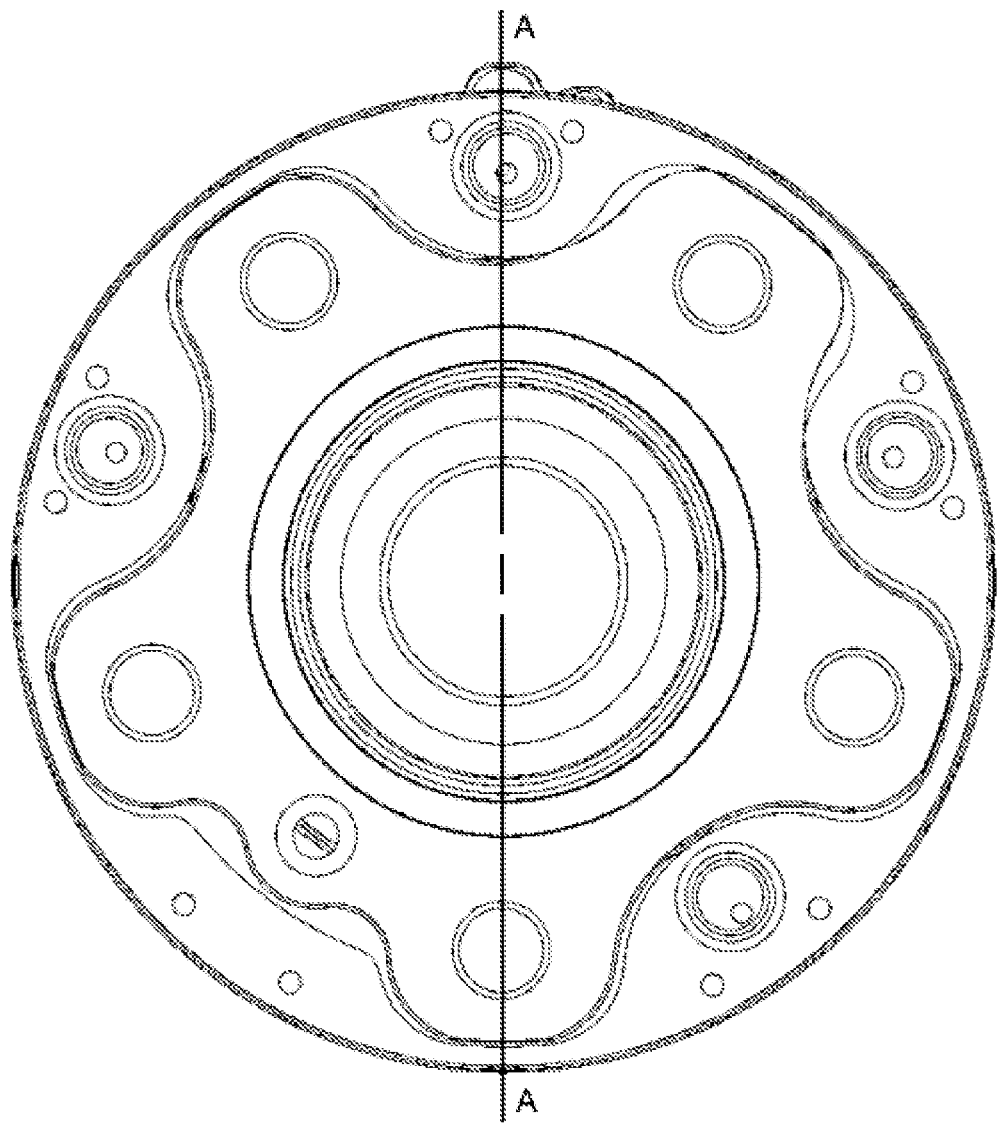
FIG. 3 is a top view of the wheel hub side of an exemplary embodiment of the rotary transmission device according to the invention.

In detail, FIG. 3 shows a top view on the wheel hub side of the exemplary embodiment of the rotary transmission device 25 according to the invention.

Figure 4:
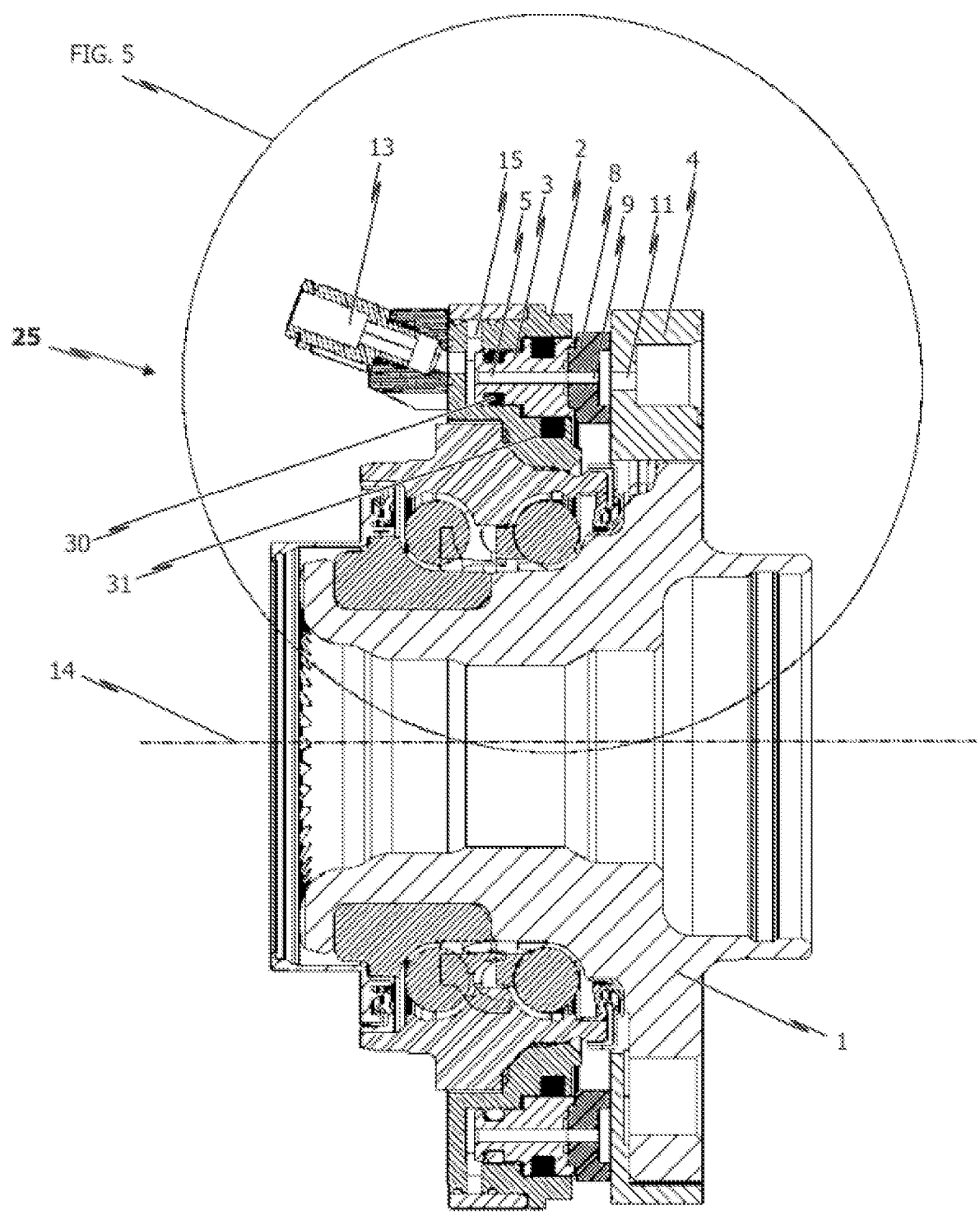
FIG. 4 is, diagrammatically, a sectional view along line A-A in FIG. 3.
Figure 5:
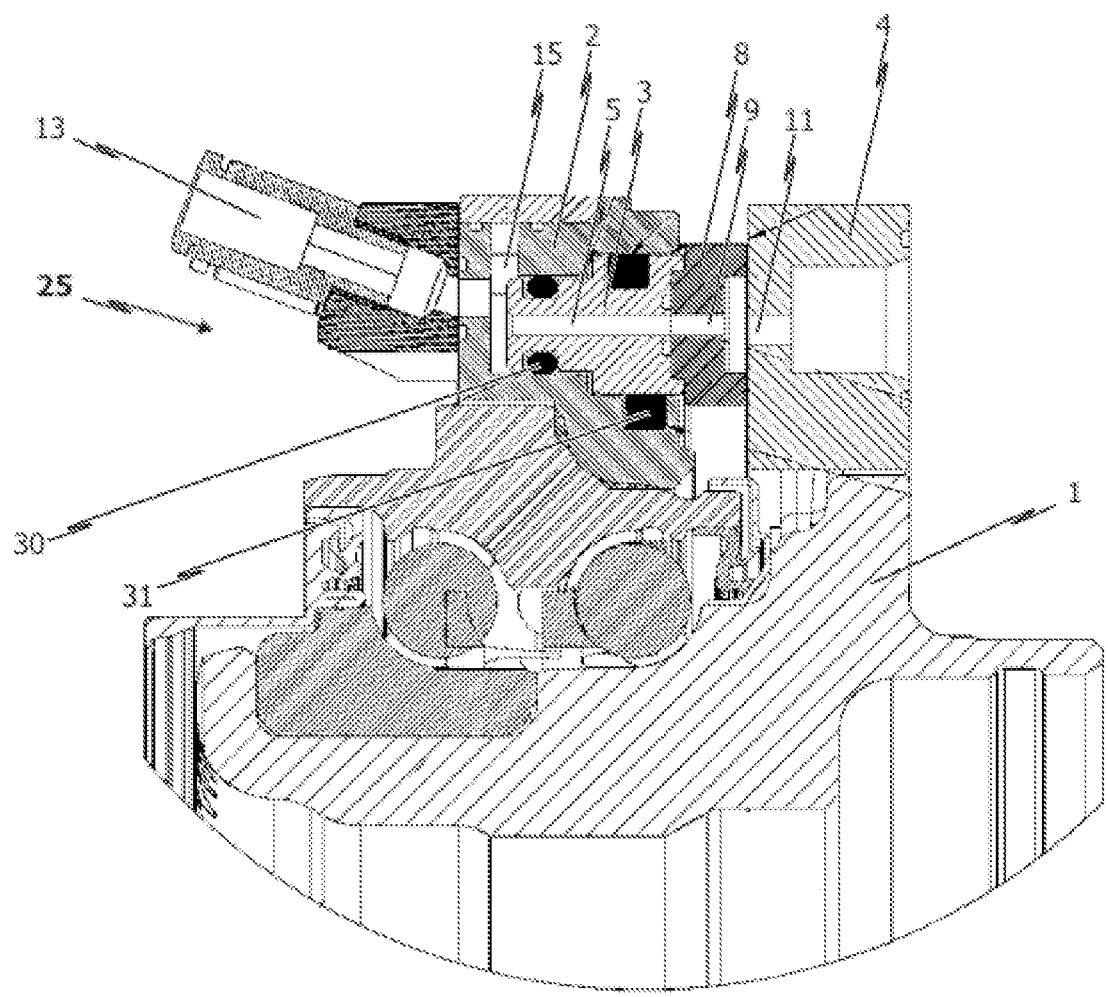
FIG. 5 is, diagrammatically, an extract from FIG. 4 in enlarged view.

FIG. 4 shows diagrammatically a sectional view along line A-A in FIG. 3, wherein the rotary transmission device 25 is in its pressure-activated state. FIG. 5 shows diagrammatically an extract from FIG. 4 in an enlarged view.

Figure 6:
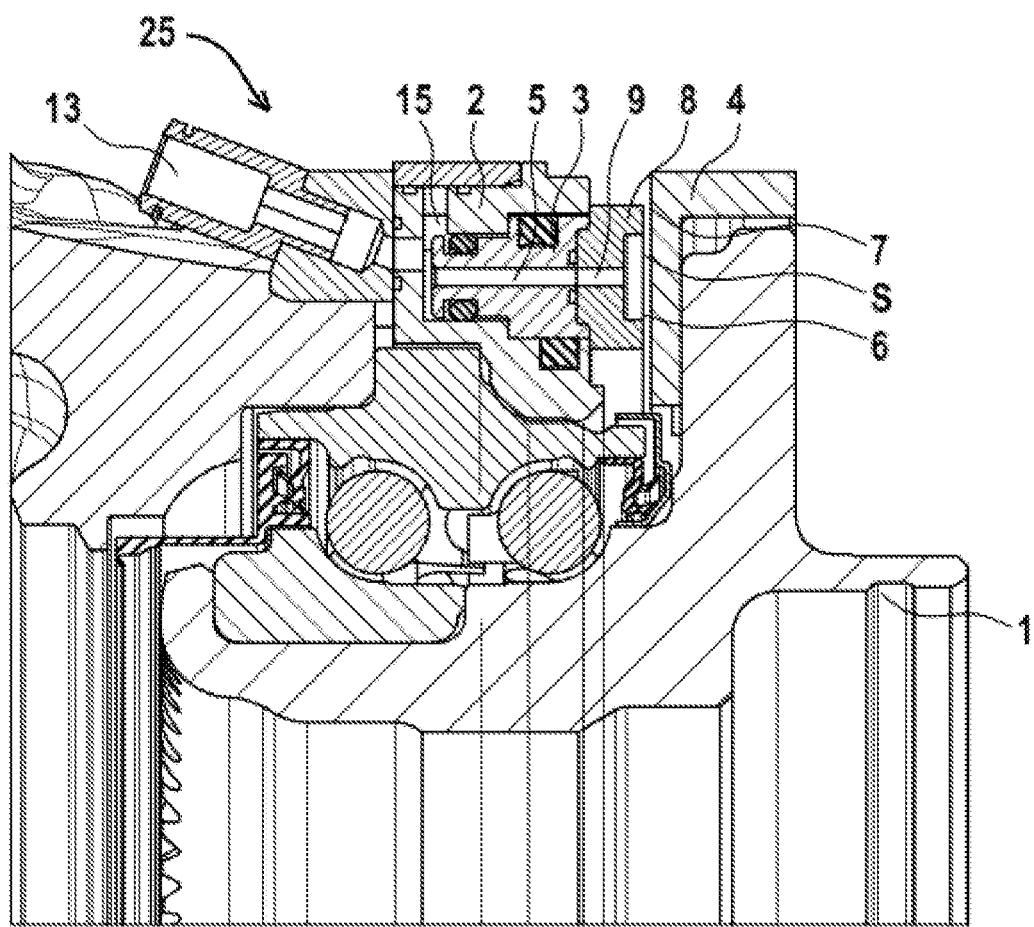
FIG. 6 is, diagrammatically, the extract from FIG. 5, wherein an exemplary embodiment of the rotary transmission device according to the invention is in its inactive state.

FIG. 6 shows diagrammatically an extract from FIG. 5, wherein the exemplary embodiment of the rotary transmission device 25 according to the invention is in its inactive state.

Briefly, the exemplary embodiment of the rotary transmission device 25 according to the invention comprises a housing structure 2 in which a piston element 3 is received so as to be displaceable between a first position and a second position relative to the housing structure 2. The piston element 3 is at the same time also configured so as to be displaceable relative to a running body 4 of the wheel hub 1 which is mounted so as to rotate about a wheel axis 14 relative to the housing structure 2.

At least one pressure medium channel 5 (precisely one in the drawings) is formed in the piston element 3 for transmission of control and/or working pressures.

In the inactive state (see FIG. 6), the piston element 3 is in its first position in which an air gap S is present between an end face 6 of the piston element 3 on the running body side and an end face 7 of the running body 4 of the wheel hub 1 on the piston side.

In the pressure-activated state of the rotary transmission device however, the piston element 3 is in its second position in which there is no air gap between the end face 6 of the piston element 3 on the running body side and the end face 7 of the running body 4 of the wheel hub 1 on the piston side, and the at least one pressure medium channel 5 of the piston element 3 opens in sealed fashion (against the external atmosphere) in at least one pressure medium channel 5 formed in the running body 4 (see FIG. 4 and FIG. 5).

Figure 7:
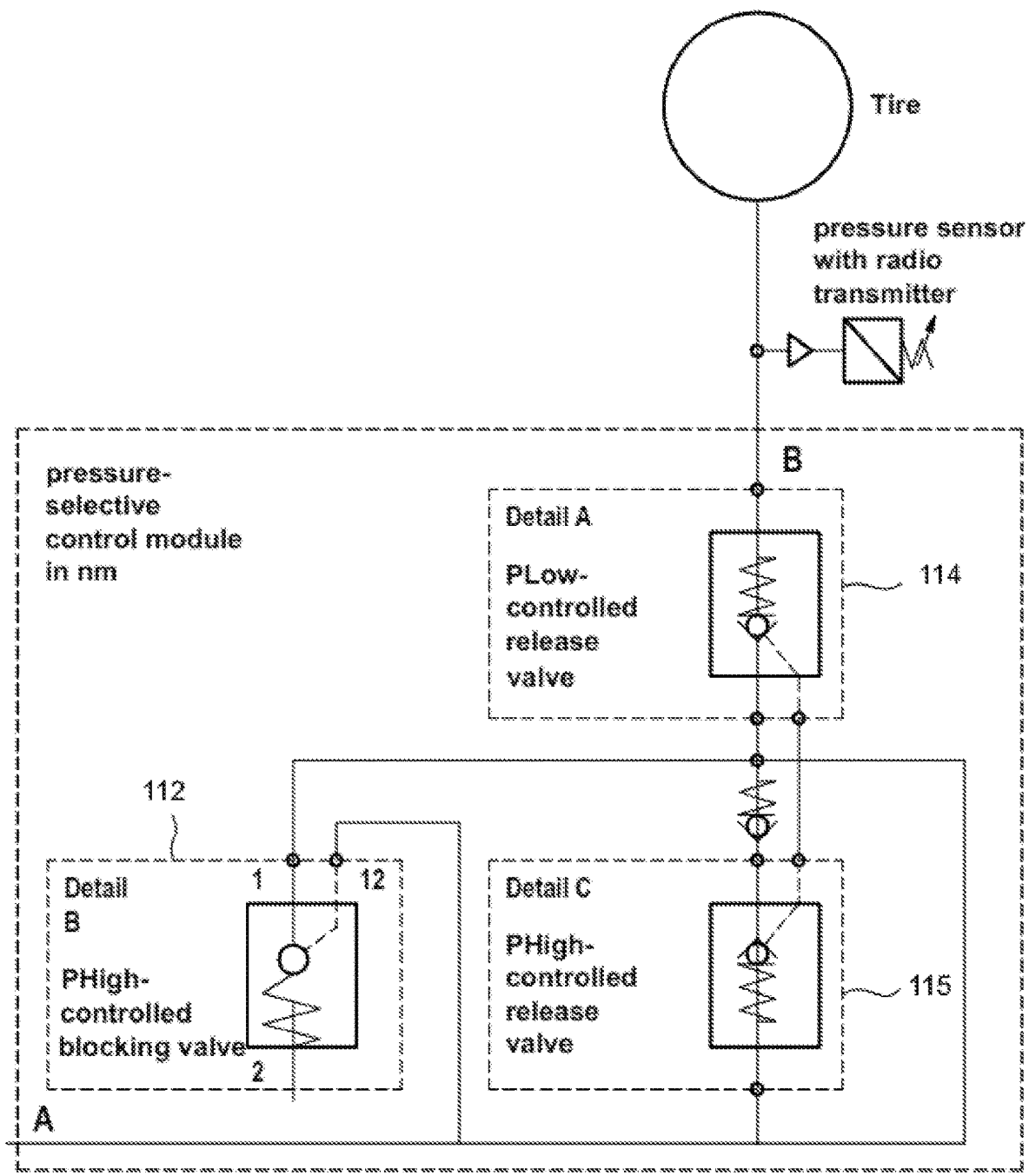
FIG. 7 is, diagrammatically and in greatly simplified form, a pneumatic diagram of the pressure-selective control module in a pressure medium supply system.
Figure 8:
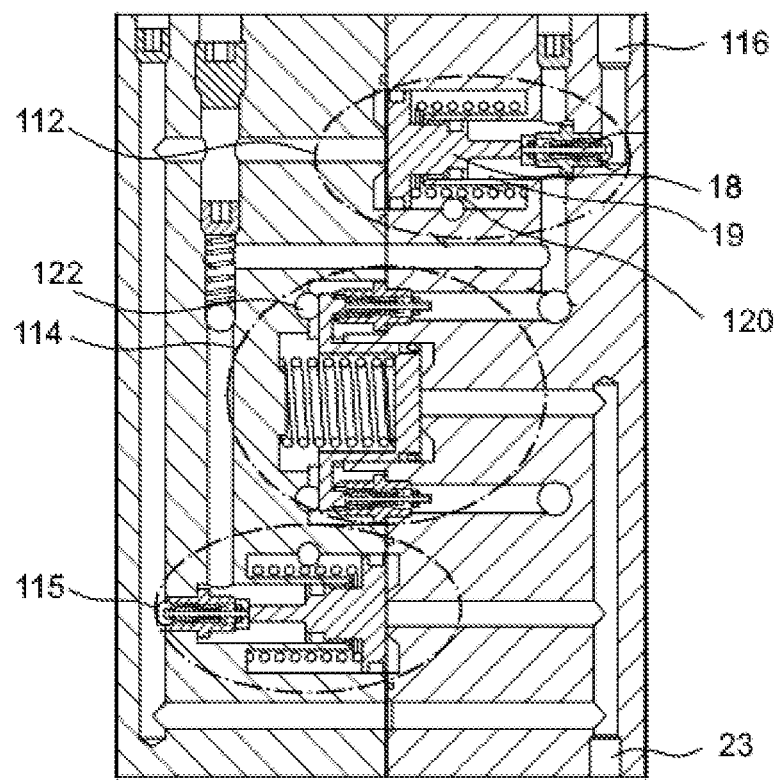
FIG. 8 is a sectional depiction of the pressure-selective control module.
Figure 9:
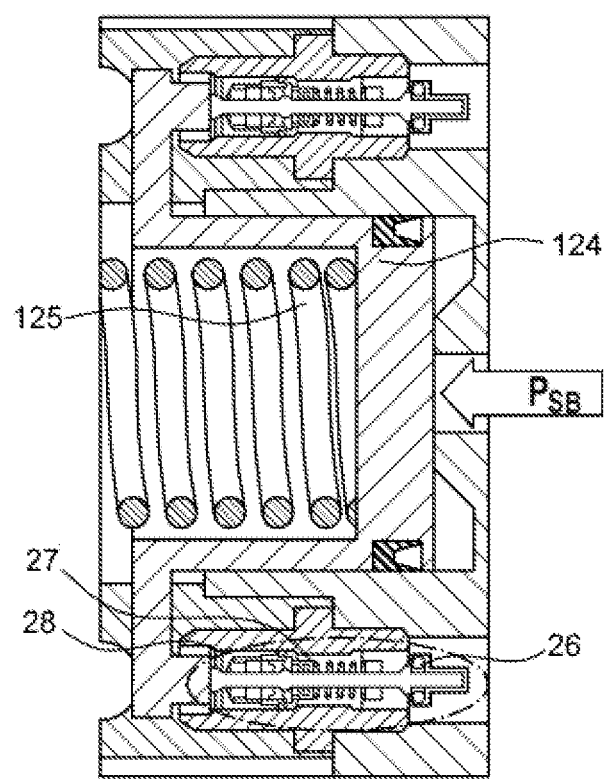
FIG. 9 is a simplified view of a check valve in at least one of the at least three control units according to FIG. 8.
Figure 10:
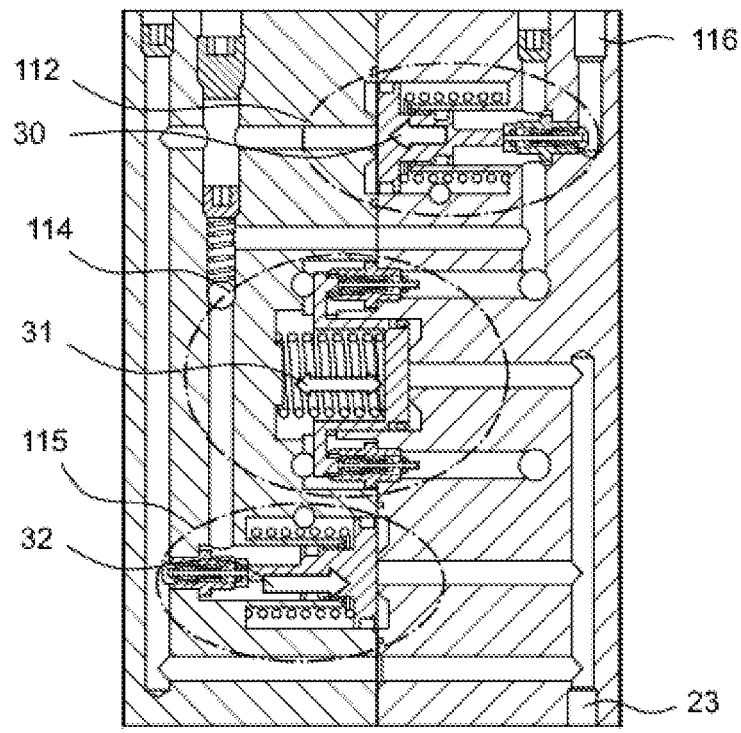
FIG. 10 is a sectional depiction according to FIG. 8, wherein an exemplary embodiment is in its rest state.

The pressure-selective control module according to FIG. 7 creates, via pneumatic lines, a connection between the pressure medium supply system A and the tire B. In the exemplary embodiment, the pressure-selective control module consists of at least three control units 112, 114, and 115, and the at least one control piston 124 which is embedded in at least one of the at least three control units and can be set in motion by a spring 120 or 125.

According to the depiction in FIG. 7, the pressure-selective control module monitors the pressure supply adapted by the pressure medium supply system. To this end, the tire pressure may be set such that it can be adapted to the resistance of the surface over which the tire rolls. Thus, for example, on wet roads, the tire pressure may be adapted to give the vehicle better grip.

Figure 11A:
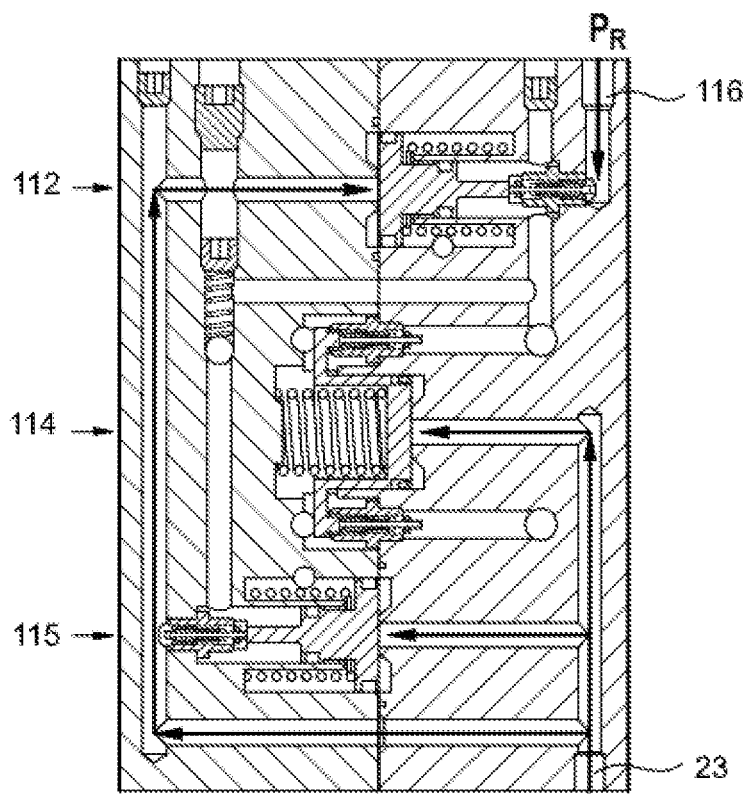
FIGS. 11A-D are sectional depictions according to FIG. 8, wherein an exemplary embodiment is in a state in which the pressure is released from the tire.

A simplified view of the exemplary embodiment is shown in the views in FIGS. 11A, 11B, 11C and 11D. The view in FIG. 11A shows the rest state of the exemplary embodiment. In this position, one of the at least three control units, such as the control unit 114 in the example in FIG. 11A, has a preloaded spring element while the others 112 and 115 have an unloaded spring element. This rest state in this exemplary embodiment corresponds to at least one opened control unit, wherein at least two control units are closed. Such a state neither allows air to be supplied to the tires nor air to be evacuated from the tires.

The closed control unit 114 in the exemplary embodiment also has a vent bore 122 through which the received tire pressure is released to atmosphere. The control unit 115 connected to the control port 23 can thus receive air which can be transported to the tire via the pressure-selective control module.

Figure 11B:
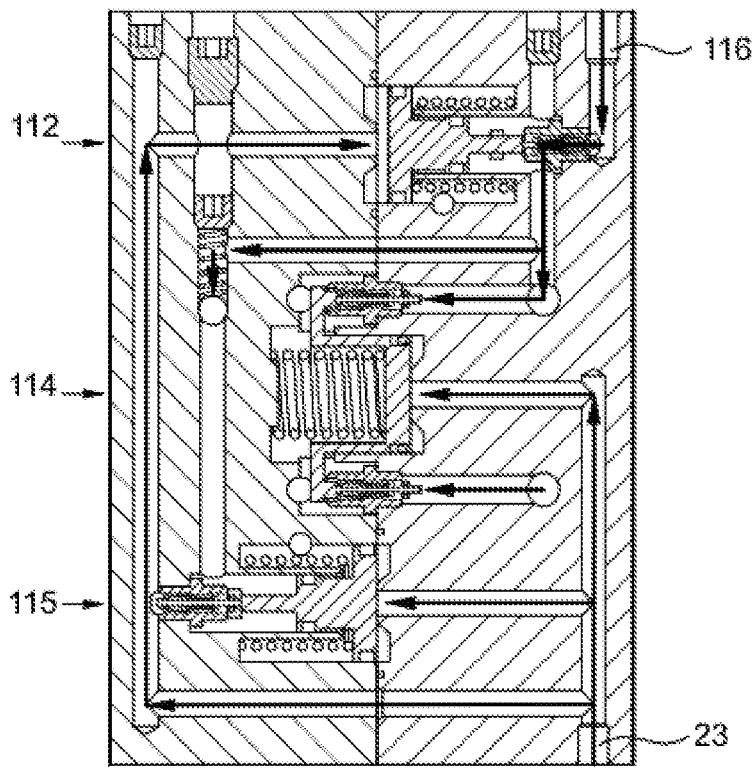

The depiction in FIG. 11B of the exemplary embodiment shows a state in which at least two of the at least three control units of the pressure-selective control module are opened and at least one control unit is closed. According to FIG. 11B, the control unit 115 is in a closed position. In this state, air from the tire can be conveyed to atmosphere. This reduces the tire pressure of the vehicle. The position of the control unit 112 corresponds here to the position of the control unit 114.

Figure 11C:
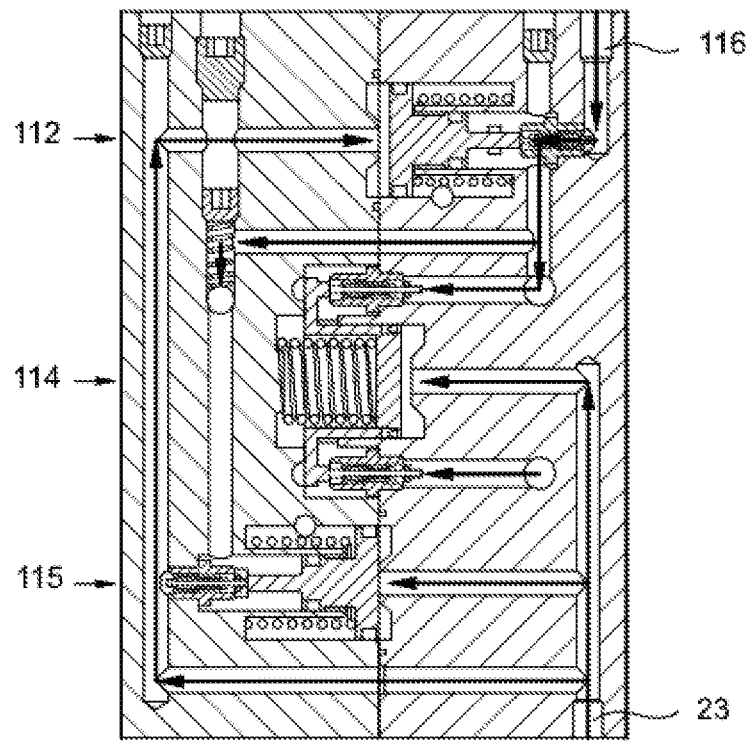

Another possibility for the pressure-selective control system according to the exemplary embodiment in FIG. 11C corresponds to the state in which a so-called locking occurs. This state of this embodiment corresponds to the position in which the control unit 112 connected to the tire is opened and the other control units are closed. This locking state allows the air emerging from the tire to be released to atmosphere, but no air can be supplied to the tire.

Figure 11D:
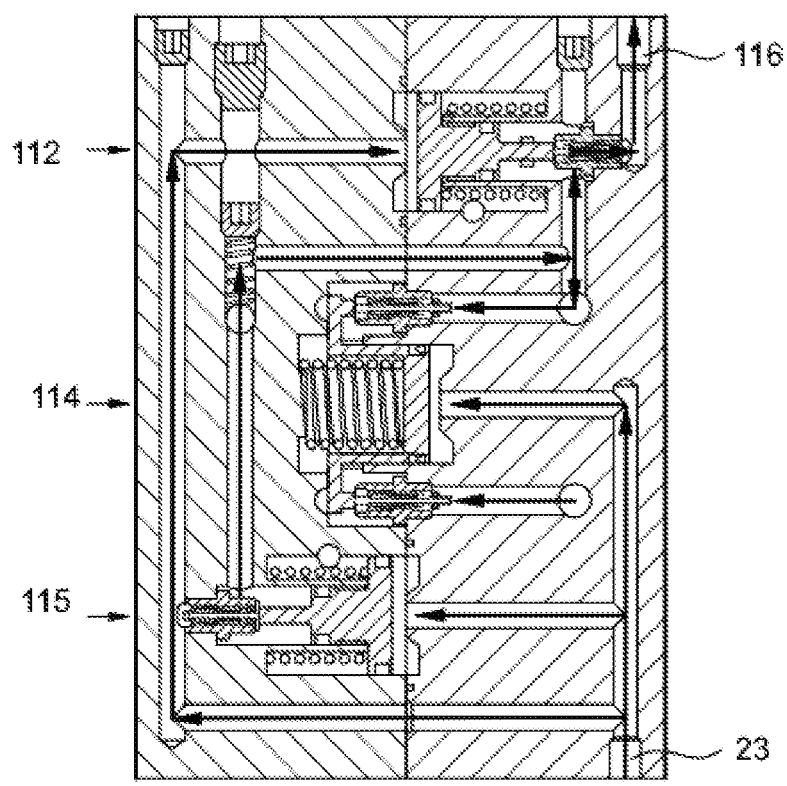

The exemplary embodiment shown in FIG. 11D shows an air supply to the tire. This state is characterized in that the control units 112 and 115 are opened and control unit 114 is closed. Because the control unit 114 is closed and the control unit 115 opened, the air supply conducted from the control port A enters the tire, since the control unit 112 is connected to the tire port 116.

As the drawings show, in the exemplary embodiment of the rotary transmission device 25 according to the invention, it is provided in particular that at its end region on the running body side, the piston element 3 has a sealing element 8 which at least in regions forms the end face 6 of the piston element 3 on the running body side, and in which at least one pressure medium channel 9 is formed. The at least one pressure medium channel 9 formed in the sealing element 8 is preferably configured axially to the pressure medium channel 4 formed in the piston element 3, and opens into the at least one pressure medium channel 5 formed in the piston element 3.

In particular, in the exemplary embodiment of the rotary transmission device 25 according to the invention and shown in the drawings, it is provided that the at least one pressure medium channel 9 formed in the sealing element 8, at least in the end face 6 on the running body side, has a diameter which is greater than the diameter of the at least one pressure medium channel 5 formed in the piston element 3.

As already indicated, in the exemplary embodiment of the rotary transmission device 25 according to the invention and shown in the drawings, also at least one pressure medium channel 11 is formed in the running body 4 of the wheel hub 1; said channel opens into the end face 7 of the running body 4 on the piston side and is configured, in regard to the at least one pressure medium channel 5 formed in the piston element 3 or in regard to the at least one pressure medium channel 9 formed in the sealing element 8, such that in a state in which the piston element 3 is in its second position (see FIG. 4 and FIG. 5), a flow path or flow route, preferably sealed against the external atmosphere, is formed from the at least one pressure medium channel 5 formed in the piston element 3 to the at least one pressure medium channel 11 formed in the running body 4.

The housing structure 2 of the rotary transmission device 25 according to the invention furthermore comprises at least one pressure medium port 13, via which control and/or working pressures can be supplied to the at least one pressure medium channel 5 formed in the piston element 3. At least in a state in which the piston element 3 is in its second position, i.e. in a state of pressure-activated rotary transmission (see FIG. 4 and FIG. a pressure medium distribution channel 15 is present between an end face of the piston element 3 opposite the end face 6 of the piston element 3 on the running body side and an inner wall of the housing structure 2, in which channel the at least one pressure medium port 13 opens.

In this context, it is advantageous if a sealing arrangement 30 or 32 is assigned to the piston element 3 in order to seal the piston element 3 against the pressure medium distribution channel 50. Similarly, in the exemplary embodiment shown in the drawings, it is provided that a (further) sealing arrangement 31 is assigned to the piston element 3 in order to seal the piston element 3 against the housing structure 2.

The housing structure 2, the piston element 3 with the sealing element 8 provided at its end region on the running body side, and the running body 4, are each formed as a ring and arranged coaxially to the wheel axis 14. Accordingly, the at least one pressure medium channel 5 formed in the piston element 3 is configured as a ring channel. The same applies accordingly to the pressure medium channel 9 formed in the sealing element 8 provided on the end region of the piston element 3 on the running body side, and the at least one pressure medium channel 11 in the running body 4 of the wheel hub 1.

In the exemplary embodiment shown in the drawings, the piston element is configured as a pneumatically actuatable piston element 3 which is transferred into its second position by application of a corresponding control pressure, in particular on its end face opposite the end face on the running body side.

In this context, it is conceivable that a preload element (not shown in the drawings) is assigned to the piston 3 in order to return or preload the piston element 3 in its first position. The preload element preferably comprises a spring element or similar.

The pneumatically actuatable piston element 3 is transferred into its first or second position preferably via a control pressure which is supplied accordingly to the pressure medium distribution channel 15. To this end, it is advantageous if a corresponding control pressure port 18 is formed in the housing structure 2.

In the exemplary embodiment of the rotary transmission device according to the invention and shown in the drawings, it is provided in particular that the piston element 3 is formed as a pneumatically actuatable piston element which can be transferred into its second position by application of a corresponding control pressure, in particular on its end face opposite the end face on the running body side. For this, it is in particular provided that the piston element 3 is movable relative to the housing structure 2 and relative to the running body 4 by application of a corresponding control pressure, wherein in particular this control pressure is different from the control and/or working pressure to be transmitted by means of the rotary transmission device 25. In this way, therefore, the piston element 3 may be actuated independently of the control and/or working pressure to be transmitted, which advantageously allows the rotary transmission device to transmit control and/or working pressures not only to the wheel hub 1 or a vehicle wheel received by the wheel hub 1, but also from the wheel hub 1 or from a vehicle wheel received by the wheel hub 1. In particular, the piston element 3 can be positioned completely independently of a control and/or working pressure to be transmitted.

In the exemplary embodiment shown in the drawings, for this the above-mentioned control pressure port 18 is provided, in order to supply and discharge as necessary a control pressure for the piston element 3 to and from a control chamber 19 assigned to the piston element 3. The control chamber 19 is formed at least in regions by a side face of the piston element 3. This side face preferably lies opposite the end face 6 of the piston element 3 on the running body side. Evidently, however, other side faces of the piston element 3 may be used to delimit the control chamber 19.

In particular, in the embodiment of the rotary transmission device 25 according to the invention and shown in the drawings, the control chamber is hermetically separated from the at least one pressure medium channel 5 formed in the piston element 3.

Alternatively, it is however also conceivable that the pneumatically actuatable piston element 3 can be transferred into the corresponding second position by the working pressure to be transmitted, which is supplied to the pressure medium distribution channel 15 via the pressure medium port 13.

To summarize, the present invention therefore concerns a system for tire pressure regulation which can increase or reduce the tire pressure of individual wheels of the vehicle. The system contains a compressed air rotary transmission system which is modified such that when not in use, the sealing elements are not in contact and hence not subject to wear. The rotary transmission system is preferably formed as a ring body. In this way, it is possible to use a driven axle without the need for drilling or otherwise modifying shafts and hubs. At the same time, due to both modifications, the slight installation space between the wheel bearing and the wheel hub 1 is used as an installation site. By the use of different control pressure levels in a single-channel system, or several pressure channels, control functions on the wheel side can be implemented without the need for electrical valves. The modification also ensures that no friction occurs when not in use.

The system according to the invention in particular includes an annular housing (stator), an annular piston with optionally radially or axially arranged sealing elements, and a running body 4 (rotor) which also contains optionally radial or axial contact faces for the sealing elements. The system may be configured with one or more channels as required. If a control pressure is transmitted to the running body 4 (rotor), the annular piston may be brought into contact optionally with the same or with a separate control pressure. After the sealing elements have come into contact with the running body 4, different pressures and pressure levels may be transmitted, optimized for wear. In the axially sealed variant, it is possible, by the length of the designed piston travel, also to compensate for the wear volume of the sealing elements and guarantee a long service life and function of the rotary transmission device 25. Provided that a separate switchable pressure is used for the piston travel, the piston may even be returned in targeted fashion. For this, a working chamber of the piston is vented during air transmission. The pressure of the air to be transmitted, in connection with the area enclosed by sealing lips, now allows the piston to be fully returned.

The system according to the invention is designed and configured as part of a tire pressure control system for transmitting separate control and/or working pressures to the vehicle wheel. In addition, the system is configured to detect a tire pressure and/or tire temperature and transmit the detected value or values to a control device. Furthermore, the system is configured to fill or evacuate a tire connected to the vehicle wheel as required.

What is claimed is:

1. A rotary transmission device for transmitting control and/or working pressures to a wheel hub or a vehicle wheel received by the wheel hub, wherein the rotary transmission device has a housing structure in which a piston element is displaceable between a first position and a second position relative to the housing structure and relative to a running body of the wheel hub which is mounted so as to rotate about a wheel axis relative to the housing structure, wherein to transmit the control and/or working pressures, at least one pressure medium channel is formed in the piston element, wherein in the first position of the piston element, an air gap is present between an end face of the piston element on a running body side and an end face of the running body on a piston element side, while in the second position of the piston element, no air gap is present between the end face of the piston element on the running body side and the end face of the running body on the piston element side, and the at least one pressure medium channel of the piston element opens in sealed fashion into at least one pressure medium channel formed in the running body;

wherein the housing structure has at least one pressure medium port via which control and/or working pressures can be supplied to the at least one pressure medium channel formed in the piston element, and wherein, at least in a state in which the piston element is in its second position, a pressure medium distribution channel is present between an end face of the piston element opposite an end face of the piston element on the running body side and an inner wall of the housing structure, into which channel the at least one pressure medium port opens, wherein the piston element is movable relative to the housing structure and relative to the running body by application of a corresponding control pressure, wherein the corresponding control pressure is different from the control and/or working pressure to be transmitted, wherein the housing structure has a control pressure port via which the corresponding control pressure is provided for supply and discharge to and from a control chamber assigned to the piston element.

2. The rotary transmission device according to claim 1, wherein the control chamber is formed at least in regions by a side face of the piston element which lies opposite the end face of the piston element on the running body side.

3. The rotary transmission device according to claim 1, wherein the control chamber is hermetically separated from the at least one pressure medium channel formed in the piston element.

4. The rotary transmission device according to claim 1, wherein at its end region on the running body side, the piston element has a sealing element which at least in regions forms the end face of the piston element on the running body side, and in which at least one pressure medium channel is formed which extends axially to the pressure medium channel formed in the piston element and opens into the pressure medium channel formed in the piston element.

5. The rotary transmission device according to claim 4, wherein the at least one pressure medium channel formed in the sealing element has, at least on the end face of the piston element on the running body side, a diameter which is greater than the diameter of the at least one pressure medium channel formed in the piston element.

6. The rotary transmission device according to claim 5, wherein a sealing arrangement is assigned to the piston element for sealing the piston element against the pressure medium distribution channel; and/or wherein a sealing arrangement is assigned to the piston element for sealing the piston element against the housing structure.

7. The rotary transmission device according to claim 1, wherein the at least one pressure medium channel formed in the running body, opens into the end face of the running body on the piston side, and with regard to the at least one pressure medium channel formed in the piston element and/or in regard to the at least one pressure medium channel formed in a sealing element, is configured such that in a state in which the piston element is in its second position, a flow path sealed against the external atmosphere is formed from the at least one pressure medium channel formed in the piston element to the at least one pressure medium channel formed in the running body.

8. The rotary transmission device according to claim 1, wherein a preload element is assigned to the piston element for preloading the piston element in its first position, wherein the preload element comprises a spring element.

9. The rotary transmission device according to claim 1, wherein the housing structure, the piston element, a sealing element at an end region of the piston element on the running body side, and the running body, are each formed as a ring and arranged coaxially to the wheel axis.

10. The rotary transmission device according to claim 1, wherein the at least one pressure medium channel formed in the piston element is configured as a ring channel.

11. The rotary transmission device according to claim 1, wherein the piston element is formed as a pneumatically actuatable piston element which can be transferred into its second position on application of the corresponding control pressure, on its end face opposite the end face on the running body side.

12. The rotary transmission device according to claim 4, wherein a preload element is assigned to the piston element for preloading the piston element in its first position, wherein the preload element comprises a spring element.

13. The rotary transmission device according to claim 4, wherein the housing structure, the piston element, the sealing element at the end region of the piston element on the running body side, and the running body, are each formed as a ring and arranged coaxially to the wheel axis.

14. The rotary transmission device according to claim 4, wherein the at least one pressure medium channel formed in the piston element is configured as a ring channel.

15. The rotary transmission device according to claim 4, wherein the piston element is formed as a pneumatically actuatable piston element which can be transferred into its second position on application of the corresponding control pressure, on its end face opposite the end face on the running body side.

16. A rotary transmission device for transmitting control and/or working pressures to a wheel hub or a vehicle wheel received by the wheel hub, wherein the rotary transmission device comprises:
  a housing structure;
  a piston element positioned in the housing structure and displaceable between a first position and a second position relative to the housing structure and relative to a running body of the wheel hub that is mounted and configured to rotate about a wheel axis relative to the housing structure,
    wherein at least one pressure medium channel is formed in the piston element and configured to transmit the control and/or working pressures,
    wherein, in the first position, an air gap is present between an end face of the piston element on a running body side and an end face of the running body on a piston element side, and
    wherein, in the second position, no air gap is present and the at least one pressure medium channel of the piston element opens in a sealed fashion into at least one pressure medium channel formed in the running body;
  at least one pressure medium port formed in the housing structure via which control and/or working pressures can be supplied to the at least one pressure medium channel formed in the piston element,
    wherein, at least in the second position, a pressure medium distribution channel is positioned between an end face of the piston element opposite an end face of the piston element on the running body side and an inner wall of the housing structure, into which channel the at least one pressure medium port opens;
  a control pressure port formed in the housing structure via which corresponding control pressure can be supplied to a control chamber assigned to the piston element,
    wherein the piston element is movable relative to the housing structure and relative to the running body by application of a corresponding control pressure, and
    wherein the corresponding control pressure is different from the control and/or working pressure to be transmitted.

17. The rotary transmission device according to claim 16, wherein the control chamber is hermetically separated from the at least one pressure medium channel formed in the piston element.

18. The rotary transmission device according to claim 16, wherein at its end region on the running body side, the piston element has a sealing element which at least in regions forms the end face of the piston element on the running body side, and in which at least one pressure medium channel is formed which extends axially to the pressure medium channel formed in the piston element and opens into the pressure medium channel formed in the piston element.

19. The rotary transmission device according to claim 16,
   wherein the at least one pressure medium channel formed in the sealing element has, at least on the end face of the piston element on the running body side, a diameter which is greater than the diameter of the at least one pressure medium channel formed in the piston element, and
   wherein a sealing arrangement is assigned to the piston element for sealing the piston element against the pressure medium distribution channel.

20. The rotary transmission device according to claim 16, wherein a spring element is configured to preload the piston element in the first position.

21. A rotary transmission device for transmitting control and/or working pressures to a wheel hub or a vehicle wheel received by the wheel hub, wherein the rotary transmission device comprises:

a housing structure;
a electromagnetically-actuatable piston element positioned in the housing structure and displaceable between a first position and a second position relative to the housing structure and relative to a running body of the wheel hub that is mounted and configured to rotate about a wheel axis relative to the housing structure,
   wherein at least one pressure medium channel is formed in the piston element and configured to transmit the control and/or working pressures,
   wherein, in the first position, an air gap is present between an end face of the piston element on a running body side and an end face of the running body on a piston element side, and
   wherein, in the second position, no air gap is present and the at least one pressure medium channel of the piston element opens in a sealed fashion into at least one pressure medium channel formed in the running body; and
at least one pressure medium port formed in the housing structure via which control and/or working pressures can be supplied to the at least one pressure medium channel formed in the piston element,
   wherein, at least in the second position, a pressure medium distribution channel is positioned between an end face of the piston element opposite an end face of the piston element on the running body side and an inner wall of the housing structure, into which channel the at least one pressure medium port opens.

\* \* \* \* \*